(12) United States Patent
Goeltz et al.

(10) Patent No.: US 10,186,726 B2
(45) Date of Patent: Jan. 22, 2019

(54) METHOD AND APPARATUS FOR MEASURING TRANSIENT STATE-OF-CHARGE USING INLET/OUTLET POTENTIALS

(71) Applicant: LOCKHEED MARTIN ENERGY, LLC, Bethesda, MD (US)

(72) Inventors: John Goeltz, Carmel, CA (US); Kean Duffey, Brighton, MA (US); Evan R. King, Quincy, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 85 days.

(21) Appl. No.: 15/029,246

(22) PCT Filed: Oct. 13, 2014

(86) PCT No.: PCT/US2014/060236
§ 371 (c)(1),
(2) Date: Apr. 13, 2016

(87) PCT Pub. No.: WO2015/057550
PCT Pub. Date: Apr. 23, 2015

(65) Prior Publication Data
US 2016/0293991 A1    Oct. 6, 2016

Related U.S. Application Data

(60) Provisional application No. 61/891,483, filed on Oct. 16, 2013.

(51) Int. Cl.
*H01M 8/18* (2006.01)
*H01M 8/20* (2006.01)
(Continued)

(52) U.S. Cl.
CPC ....... *H01M 8/188* (2013.01); *H01M 8/04552* (2013.01); *H01M 8/20* (2013.01); *Y02E 60/528* (2013.01)

(58) Field of Classification Search
CPC ............ H01M 8/04; H01M 8/18; H01M 8/20; H01M 8/04537
See application file for complete search history.

(56) References Cited

U.S. PATENT DOCUMENTS 5,942,102 A    8/1999  Hodges et al.
6,413,410 B1   7/2002  Hodges et al.
(Continued)

FOREIGN PATENT DOCUMENTS

CA    2236848 A1    5/1997
CA    2823963 A1    7/2012
(Continued)

OTHER PUBLICATIONS

International Search Report and Written Opinion for PCT/US2014/060236 dated Jan. 8, 2015.
(Continued)

*Primary Examiner* — Kenneth J Douyette
(74) *Attorney, Agent, or Firm* — Baker & Hostetler LLP

(57) ABSTRACT

The present invention relates to redox flow batteries and methods and apparatuses for monitoring the compositions of the electrolytes therein. In particular, the present invention relates to methods and configurations for monitoring the state-of-charge of an electrolyte stream of a flow cell or flow battery.

14 Claims, 6 Drawing Sheets

(51) Int. Cl.
*H01M 8/04* (2016.01)
*H01M 8/04537* (2016.01)

(56) References Cited

U.S. PATENT DOCUMENTS

| | | |
|---|---|---|
| 8,587,255 B2 | 11/2013 | Parakulam et al. |
| 8,980,484 B2 | 3/2015 | Chang et al. |
| 2003/0170906 A1 | 9/2003 | Swain et al. |
| 2005/0158614 A1 | 7/2005 | Hennessy |
| 2006/0049064 A1 | 3/2006 | Horvath et al. |
| 2008/0060196 A1 | 3/2008 | Wang et al. |
| 2008/0193828 A1 | 8/2008 | Sahu |
| 2008/0204708 A1 | 8/2008 | Shaw |
| 2009/0026094 A1 | 1/2009 | Deng et al. |
| 2010/0047671 A1* | 2/2010 | Chiang ............ B60L 11/1879 429/50 |
| 2010/0084288 A1 | 4/2010 | Hodges et al. |
| 2011/0081563 A1 | 4/2011 | Christensen et al. |
| 2011/0086247 A1 | 4/2011 | Keshavarz et al. |
| 2011/0223450 A1 | 9/2011 | Horne et al. |
| 2012/0263986 A1 | 10/2012 | Fulop et al. |
| 2013/0011702 A1* | 1/2013 | Horne ............ B60L 11/1824 429/51 |
| 2013/0029185 A1 | 1/2013 | Ridley et al. |
| 2013/0084482 A1 | 4/2013 | Chang et al. |
| 2013/0084506 A1 | 4/2013 | Chang et al. |
| 2013/0095362 A1 | 4/2013 | Keshavarz et al. |
| 2013/0157162 A1 | 6/2013 | Dong et al. |
| 2013/0224538 A1 | 8/2013 | Jansen et al. |
| 2013/0269566 A1 | 10/2013 | Van Polen |
| 2014/0030631 A1 | 1/2014 | Esswein et al. |
| 2014/0238875 A1 | 8/2014 | Bekki et al. |
| 2014/0299014 A1 | 10/2014 | Van Polen |
| 2016/0111740 A1 | 4/2016 | Spaziante et al. |
| 2016/0164125 A1 | 6/2016 | Pijpers |
| 2016/0254562 A1 | 9/2016 | Morris-Cohen et al. |
| 2016/0293979 A1 | 10/2016 | King et al. |
| 2016/0372777 A1 | 12/2016 | Buckley et al. |

FOREIGN PATENT DOCUMENTS

| | | |
|---|---|---|
| CN | 1204400 A | 1/1999 |
| EP | 1998163 A1 | 12/2008 |
| EP | 2648258 A1 | 10/2013 |
| JP | 2004-336734 A | 11/2004 |
| JP | 2006-351346 A | 12/2006 |
| WO | WO-90/03666 A1 | 4/1990 |
| WO | 2008148148 A1 | 12/2008 |
| WO | WO-2010/118175 A2 | 10/2010 |
| WO | WO-2012/094674 A2 | 7/2012 |

OTHER PUBLICATIONS

Mohamed, M.R., et al., "Estimating the State-of-Charge of all-Vanadium Redox Flow Battery using a Divided, Open-circuit Potentiometric Cell," Elektronika IR Elektrotechnika, 2013, pp. 39-41, 19.

Extended European Search Report from European Patent Application No. 14862634.4, dated May 11, 2017.

Corcuera et al., "State-of-charge monitoring and electrolyte rebalancing methods for the vanadium redox flow battery," European Chemical Bulletin, 2012, pp. 511-519, vol. 1.

Pop et al., "State-of-the-art of battery state-of-charge determination," Measurement Science and Technology, 2005, pp. R93-R110, vol. 16.

Skyllas-Kazacos et al., "State of charge monitoring methods for vanadium redox flow battery control," J Power Science, 2011, pp. 8822-8827, vol. 196.

Soloveichik, "Flow Batteries: Current Status and Trends," 2015, Chem. Rev., 115 (20), pp. 11533-11558.

International Search Report and Written Opinion from PCT/US16/65160, dated Feb. 17, 2017.

Extended European Search Report from European Application No. 14858186.1, dated Apr. 26, 2017.

Extended European Search Report from European Patent Application No. 15868031.4, dated Jun. 7, 2018, 8 pages.

\* cited by examiner

METHOD AND APPARATUS FOR MEASURING TRANSIENT STATE-OF-CHARGE USING INLET/OUTLET POTENTIALS

CROSS REFERENCE TO RELATED APPLICATIONS

This application is a 35 U.S.C. § 371 National Stage entry of International Patent Application PCT/US2014/060236, filed on Oct. 13, 2014, which claims the benefit of priority of U.S. Provisional Patent Application Serial No. 61/891,483, filed on Oct. 16, 2013, the contents of each of which are incorporated by reference in their entirety for any and all purposes.

TECHNICAL FIELD

The present invention relates to redox flow batteries and methods for operating the same.

BACKGROUND

Despite the critical importance of monitoring and measuring the relative state-of-charge (SOC) of an electrolyte entering or exiting an electrochemical cell or stack in real time, the prior art in energy storage and utilization does not teach robust methods or apparatuses for doing so in liquid systems. All previous attempts to conduct such measurements appear to be subject to fouling, drifting, or otherwise becoming unreliable over time. Furthermore, previous attempts measure and/or indicate the SOC of the battery (i.e., both positive and negative sides) rather than the SOC of an individual electrochemical half-cell (i.e., positive or negative side). The present inventions are directed to addressing at least one of these deficiencies.

SUMMARY

Certain embodiments of the present invention(s) are directed to individual operating flow cells or stacks of cells, each cell or stack comprising: (a) at least one half-cell comprising an inlet and an outlet, through which a electrolyte flows during the operation of the flow cell, thereby defining inlet and outlet streams of the electrolyte, respectively, for that half-cell, with each said inlet and outlet streams characterized by local states-of-charge; and (b) first and second electrodes positioned to contact and be in electrochemical communication with the inlet and outlet streams, respectively, and configured to allow detection of an electric potential difference between the two electrodes, said electrical potential difference reflective of the difference in the state-of-charge of the electrolyte in said inlet and outlet streams; said first and second electrodes measuring electric potential difference between the two electrodes. Other embodiments further comprise correlating the monitored difference in electrical potential with a pre-defined set of control conditions indicative of state-of-charge or stoich (terms that are known in the art and defined vide infra). Other embodiments still further comprise adjusting at least one parameter associated with the operating electrochemical flow cell so as to alter the operation of the cell.

Other embodiments are directed to methods of operating flow cells or stacks, each method comprising at least one half-cell comprising an inlet and an outlet through which electrolyte flows during the operation of the cell, thereby defining inlet and outlet streams of the electrolyte, respectively, for that half-cell, each inlet and outlet stream having a different local state-of-charge of the half-cell electrolyte, said method comprising measuring a difference in electrochemical potential between the inlet and outlet streams of the at least one half-cell.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

In FIG. 4A, the positive (right cycle) and negative (left cycle) electrolytes are circulated through a cell or stack where active materials are charged and discharged, oxidizing one side and reducing the other during any given operation. In FIG. 4B, two voltage sensing electrodes 2 and 3 are positioned in electrochemical contact with the inlet (5) and outlet (6) streams of at least one electrochemical half-cell of cell or stack 1, and the potential difference between electrodes 2 and 3 is measured by device 4.

DETAILED DESCRIPTION OF ILLUSTRATIVE EMBODIMENTS

Figure 1:
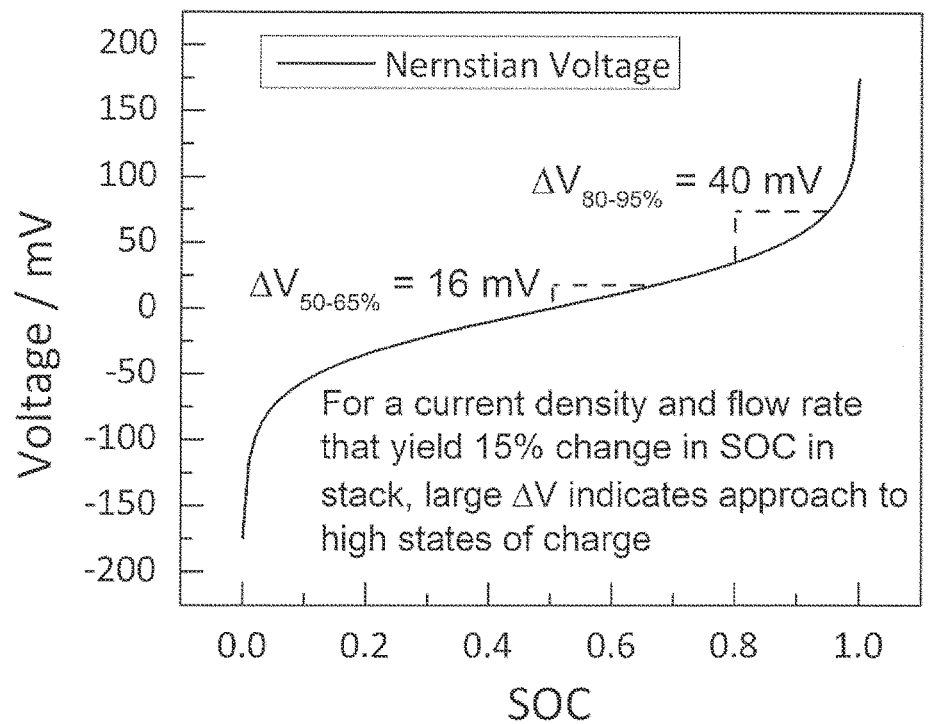
FIG. 1 depicts a hypothetical half-cell wherein electrolyte enters at 50% SOC and exits at 65% SOC at 20° C., for example during charging of a flow battery. A voltage of −16 mV is expected across the voltage sense electrodes as defined by Nernstian electrochemical behavior.

The present invention relates to redox flow cells (including flow batteries) and methods and apparatuses for monitoring the compositions of the electrolytes therein. In particular, the present invention relates to methods and configurations for monitoring the state-of-charge of an electrolyte stream of a flow cell, flow battery, or stack thereof The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to apparatuses and methods of using said apparatuses. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

As used herein, the terms "negolyte" and "posolyte," generally refer to the electrolytes associated with the negative electrode and positive electrodes.

The term "state of charge" (SOC) is well understood by those skilled in the art of electrochemistry, energy storage, and batteries. The SOC is determined from the concentration ratio of reduced to oxidized species at an electrode ($X_{red}/X_{ox}$). For example, in the case of an individual half-cell, when $X_{red}=X_{ox}$ such that $X_{red}/X_{ox}=1$, the half-cell is at 50% SOC, and the half-cell potential equals the standard Nernstian value, $E^\circ$. When the concentration ratio at the electrode surface corresponds to $X_{red}/X_{ox}=0.25$ or $X_{red}/X_{ox}=0.75$, the half-cell is at 25% or 75% SOC respectively. The SOC for a full cell depends on the SOCs of the individual half-cells and in certain embodiments the SOC is the same for both positive and negative electrodes. In such a case, measurement of the cell potential for a battery at its open circuit potential, and using Equations 2 and 3 the ratio of $X_{red}/X_{ox}$ at each electrode can be determined, and therefore the SOC for the battery system can be determined.

The term "stoich" is also well known in the art of fuel cells and is defined as the ratio of the reactant flux supplied to an electrode to the reactant flux consumed at a given current density. It is used in this way herein. Stoich may be calculated from the concentration of reactant in the bulk electrolyte at the inlet, the flow rate, and the current at the electrode.

The present invention enables a measurement of the difference in the solution potential of an electrochemical half-cell at the inlet and the outlet of said half-cell—i.e., before and after the cell/stack charges or discharges the electrolyte flowing through it. As is known in the art of electrochemistry, for a Nernstian system, the potential is defined by the following equation $$E=E^0-RT/nF\ ln(Q)$$

where E is the voltage of the half-cell versus a given reference, $E^0$ is the formal potential, often approximated as the half-wave potential, R is the gas constant, T is the temperature in Kelvin, n is the number of electrons, F is the Faraday constant, and Q is the reaction quotient. Q is an expression of the state of charge of the electrolyte and equals the ratio of the concentrations, e.g., [Red]/[Ox] or the equivalent ratio of mole fractions.

As will be discussed further below, in certain embodiments, inert electrodes such as carbon rods are inserted in the inlet stream and the outlet stream of a half-cell. Each becomes "pinned" to the potential of the solution with which it is in fluidic contact according to the local state of charge of the half-cell and the Nernst equation above, as opposed to the Open Circuit Voltage (OCV) of the flow cell itself (i.e., both half-cells) or a reference electrode. As used herein the terms related to "pinning" of an electrode to the potential of an electrolyte at a given state of charge may be understood as a consequence of the electrode facilitating both oxidation and reduction reactions in a dynamic equilibrium. The potential is commonly taken to be defined by the Nernst equation using the relative concentrations of the oxidized and reduced species at the electrode, though it may also be determined empirically for a system of interest.

When the state-of-charge (SOC) of the inlet and outlet of a half-cell are different (e.g., during charge or discharge), a voltage may be sensed across the two electrodes. This difference may be then mapped to the Nernst equation for a given half-cell electrolyte for quantitative information (such as stoich, utilization, etc., see, e.g., FIG. 1) or may be used in more qualitative or empirical ways.

In particular embodiments, the present invention is directed to methods of operating a flow cell, each method comprising at least one half-cell comprising an inlet and an outlet through which electrolyte flows during the operation of the cell, thereby defining inlet and outlet streams of the electrolyte, respectively, for that half-cell, each inlet and outlet stream having a different local state-of-charge of the half-cell electrolyte, said method comprising measuring a difference in electrochemical potential between the inlet and outlet streams of the at least one half-cell. In certain of these embodiments, the difference in the local electrochemical potentials in the inlet and outlet is compared with a calibration curve.

While the specific embodiments are described here in terms of method of operating individual flow cells, is should be apparent that these embodiments include those comprising operating a plurality of flow cells, or flow cells optionally configured in a stack or plurality of stacks. As used herein, the term "stack" or "cell stack" or "electrochemical cell stack" refers to a collection of individual electrochemical cells that are electrically connected. The cells may be electrically connected in series or in parallel. The cells may or may not be fluidly connected.

So as to aid in understanding the principles of the present invention(s), the following explanations are provided. However, the scope of the invention, either in its entirety or with respect to individual embodiments, should not be considered limited by these explanations.

A first derivative of the Nernst equation yields the following equation:

$$\frac{dE}{dS} = \frac{RT}{ZF} \frac{100}{S^2 - 100S}$$

where dE represents the change in potentials across the electrodes as described in claim 1 and dS can be calculated by:

$$dS = \frac{I}{FC\text{Flow}}$$

where I is current, F is the Faraday constant, C is molar concentration of the active species and Flow is the volumetric flow rate. This dE/dS value as measured by a system comprising the present invention can then be plotted vs. an assumed state of charge of the system over time using the following equation:

$$S2 = S1 + \frac{I}{FCV}$$

where S2 is the new state of charge (SOC), S1 is an original SOC and V is the volume of the system under consideration.

Alternatively, varying C (molar concentration) may also be done, along with varying S1, to minimize the error of the data set and theoretical curve as a way of determining concentration of the active species in the system, which may be known or suspected of changing over time.

In some embodiments of the methods described, the difference in the local electrochemical potentials in the inlet and outlet informs a change in one or more electrolyte flow rates. In other embodiments, the difference in the local electrochemical potentials in the inlet and outlet informs a change in one or more operating current densities, power densities, or voltages in a cell, stack, or plurality of cells or stacks. If the SOC of the system is known (using another method known in the art, such as a calibrated ORP probe), using the methods described herein and the devices described below would allow you to calculate flow based on the following equations:

$$E2 - E1 = -\frac{RT}{ZF}\ln\left(\frac{100-S2}{S2}\right) + \frac{RT}{ZF}\ln\left(\frac{100-S1}{S1}\right)$$

$$S2 - S1 = \frac{I}{FC\text{Flow}}$$

where E2−E1 is provided by the system in claims 1 and S1 is the SOC of the system. The first equation is used to solve for S2, the SOC of the cell(s) outlet, the difference in S2−S1 can then be used to calculate either C (molar concentration) or Flow (volumetric flow) of the system or derive the operating stoich.

Figure 2:
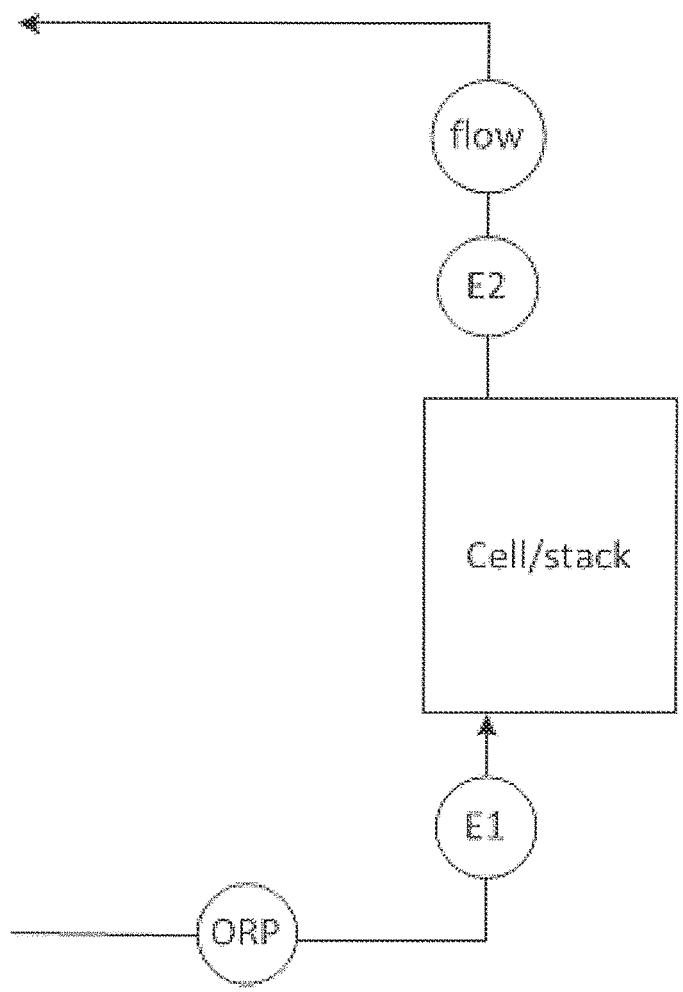
FIG. 2 illustrates one possible configuration of how an ORP (oxidation reduction potential) probe or a flow meter or both may be coupled with the voltage sensed across E1 and E2 to yield information about state-of-charge, stoich, or active material concentration.

In certain of these methods, the difference in the local electrochemical potentials in at least one inlet and at least one outlet may be combined with another sensor output to provide information about the operating system. Such sensor outputs include, but are not limited to pH, ORP, flow meter, conductivity, viscosity, spectroscopic (UV/vis, NIR, IR, Raman, etc.), other SOC ascertaining methods, cell voltage, stack voltage, shunt current, or a combination thereof Such a configuration is illustrated in FIG. 2.

Figure 3:
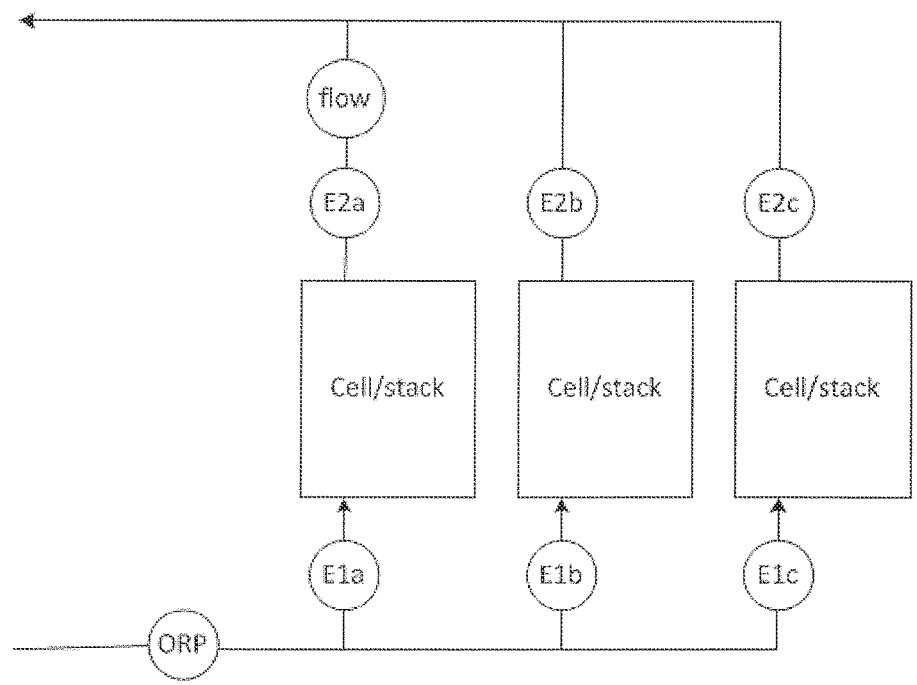
FIG. 3 illustrates one configuration of how multiple cells or stacks may be connected fluidically in parallel (shown) or in series (not shown). In this case, multiple instances of the present invention may be used across half-cells in multiple cells or stacks, in some cases obviating the need for multiple ORPs, flow meters, or other devices.

The invention(s) provide(s) that the difference in the local electrochemical potentials in at least one inlet and at least one outlet is used to assess the relative performance of at least one cell, stack, or plurality of cells or stacks. This is illustrated in FIG. 3, where the inlet SOC of the system to each stack is measured once and the outlet flow of a single stack is measured. It is also implied that the current of each stack is well defined or measured. In this case, the specific equations and system measurements can be made as described herein for a single cell or stack plumbed fluidically in parallel with a number of other cells or stacks or one or more of the systems described below can be used (in some embodiments by adding a single carbon electrode to the outlet of each cell or stack half-cell) to relate to these same parameters for all other cells or stacks in the parallel system.

Certain of these inventive methods further comprise correlating the monitored difference in electrical potential with a pre-defined set of control conditions indicative of state-of-charge or stoich. These steps allow the operator to know when it is necessary to alter operating parameters of the embodied devices, for example by adjusting the flow rate of the electrolyte, altering the SOC of either or both electrolytes by independent chemical or electrical oxidants or reductants, by switching the charging to discharging (or vice versa), by increasing or decreasing the current density in a galvanostatic operation or the voltage in a potentiostatic operation, or adjusting the current input or output from the cell(s). Other steps are provided below. Certain other embodiments provide further adjusting at least one of these parameters associated with the operating electrochemical flow cell so as to alter the operation of the cell.

Figure 4B:
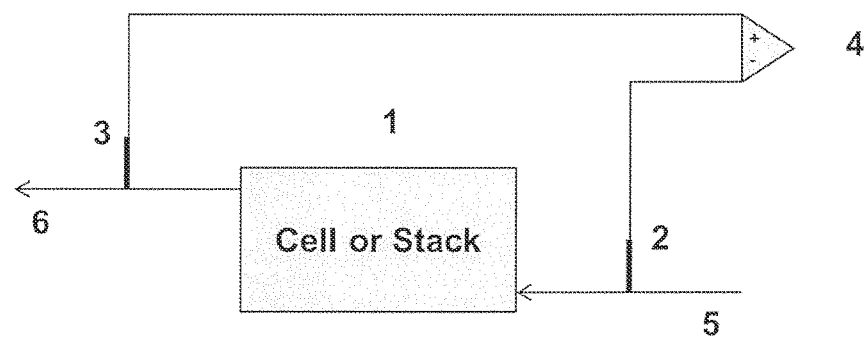
Figure 5:
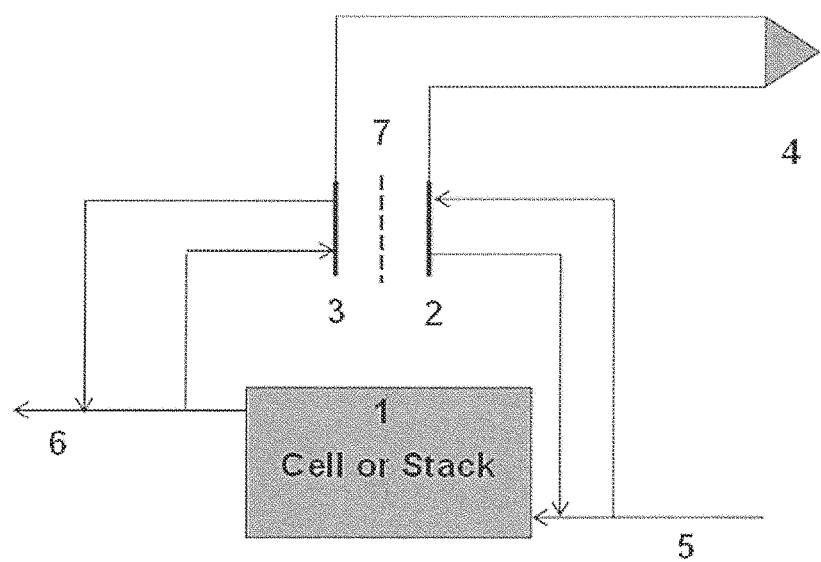
FIG. 5 illustrates another exemplary embodiment of the present invention, wherein two voltage sensing electrodes 2 and 3 are positioned in electrochemical contact with the inlet (5) and outlet (6) streams of at least one electrochemical half-cell of cell or stack 1, and the potential difference between electrodes 2 and 3 is measured by device 4. In this configuration, a secondary "voltage sensing cell" comprising separator 7 provides an ionic path between the sense electrodes 2 and 3, rather than the half-cell electrolyte manifold within cell or stack 1 providing the ionic path, as in FIG. 4B.

To this point, the invention has largely been described in terms of methods of determining or monitoring the state-of-charge of an electrochemical half-cell, flow cell, or stack of flow cells, and optionally taking action based on the results of such determining or monitoring. But the invention also includes embodiments directed to electrochemical half-cell, flow cell, or stack of flow cells that employ any of these methods described herein. Specific embodiments also provide individual operating flow cells, each flow cell comprising: (a) at least one half-cell comprising an inlet and an outlet, through which an electrolyte flows during the operation of the flow cell, thereby defining inlet and outlet streams of the electrolyte, respectively, for that half-cell, with each said inlet and outlet streams characterized by local states-of-charge; and (b) first and second electrodes positioned to contact and be in electrochemical communication with the inlet and outlet streams, respectively, and configured to allow detection of an electric potential difference between the two electrodes, said electrical potential difference reflective of the difference in state-of-charge of the electrolyte in said inlet and outlet; said first and second electrodes measuring electric potential difference between the two electrodes, said difference reflecting the states-of-charge of the electrolyte of said half-cell in said inlet and outlet. In some embodiments, the electrodes are positioned in at least one inlet and at least one outlet fluid path with electrochemical communication through at least one of the cells or stacks. See FIG. 4B for one exemplary, non-limiting configuration. In some embodiments, the electrodes in contact with the inlet and outlet electrolyte streams are positioned across a separator to compose an electrochemical cell. See, e.g., FIG. 5 for one exemplary, non-limiting configuration.

Figure 4A:
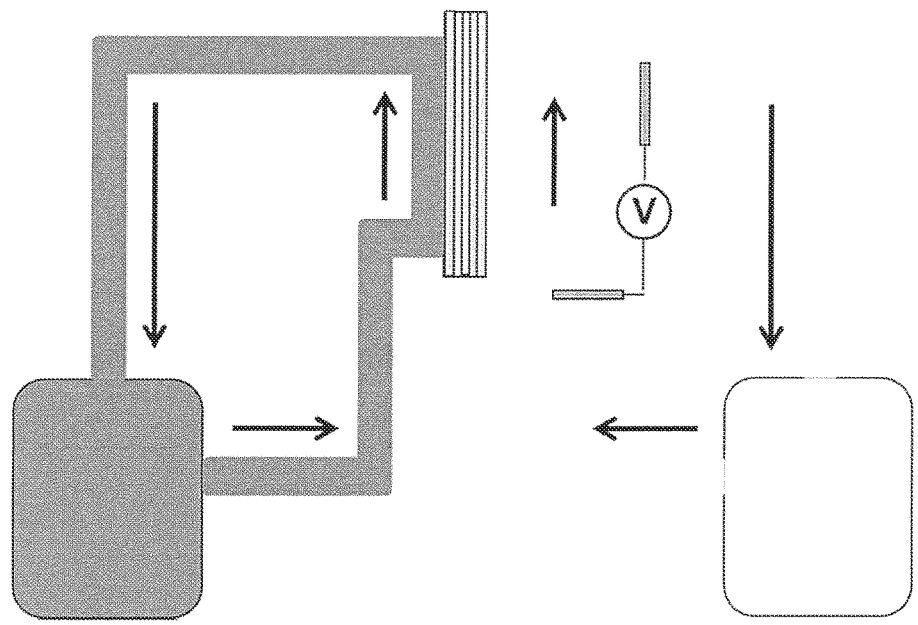
FIG. 4A and FIG. 4B illustrate exemplary embodiments of the invention.

While the electrodes may comprise any material suitable for use in the prescribed methods, these electrodes are preferably electrochemically inert. In preferred embodiments, the electrodes comprise carbon, for example graphitic or glass carbon. In other embodiments, one or more of the electrodes may comprise titanium, steel, aluminum, zinc, platinum, iridium, ruthenium, or alloys or oxides thereof While the specific embodiments are described here in terms of flow cells, is should be apparent that these embodiments also include larger systems, for example those comprising a plurality of flow cells, optionally configured in a stack or plurality of stacks. One such energy storage system is depicted in FIG. 4A. In FIG. 4A, the positive (right cycle) and negative (left cycle) electrolytes are circulated through a cell or stack where active materials are charged and discharged, oxidizing one side and reducing the other during any given operation. During these operations it is desirable to know many parameters for each electrolyte irrespective of the condition of the cell/stack, including temperature, pH, conductivity, and state of charge (i.e., the ratio of charged to uncharged material). While some methods of measuring many of these parameters are known in some form in the art, a method for directly measuring the stoich (or utilization) of each electrolyte in the cell/stack in a liquid system is not known in the art.

It is generally desired in the art of energy storage and fuel cells that the energy lost to pumping electrolytes at unnecessarily high flow rates be minimized It is thus desirable to operate at high utilizations by pumping a minimum of electrolyte through the cell/stack. On the other hand, it is also generally known that lower stoichs may result in mass transport polarization losses, increased parasitic reactions, or both at the electrode in question including hydrogen evolution, oxygen evolution, chlorine evolution, or other reactions, depending on the composition of the electrolyte. It may then be desirable to measure the stoich or utilization in real time during operation such that these parameters may be used in a control system, for example to stop charging once the stoich falls below a certain level or to modulate pumping rates over the course of a charge/discharge cycle to achieve a consistent or optimized utilization. For example, if parasitic reactions or polarization losses are seen to dominate above a voltage difference of 15 mV between the inlet and outlet, the system can be made to respond and mitigate these reactions: charging or discharging may be stopped, pump rates may be increased, etc. Another example involves startup/shutdown procedures such as those known in the art of fuel cells and HBr flow batteries, where one electrolyte is left flowing until the quantity of the other electrolyte left in the electrode is fully discharged via shorting or crossover mechanisms. The present invention allows one to determine this endpoint; when the voltage across the inlet/outlet is substantially zero, the electrolyte is not being charged or discharged upon passing through the active area, and the reaction is effectively done.

In further embodiments, the operating flow cells may be incorporated into electrochemical devices, including fuel cells and flow batteries, which themselves are incorporated into larger systems, for example, including cell stacks, storage tanks and pipings for containing and transporting the electrolytes, control hardware and software (which may include safety systems), and at least one power conditioning unit as part of an energy storage system. In such systems, the storage tanks contain the electroactive materials. The control software, hardware, and optional safety systems include all sensors, mitigation equipment and electronic/hardware controls and safeguards to ensure safe, autonomous, and efficient operation of the flow battery or other energy storage system.

Such storage systems may also include a power conditioning unit at the front end of the energy storage system to convert incoming and outgoing power to a voltage and current that is optimal for the energy storage system or the application. For the example of an energy storage system connected to an electrical grid, in a charging cycle the power conditioning unit would convert incoming AC electricity into DC electricity at an appropriate voltage and current for the electrochemical stack. In a discharging cycle the stack produces DC electrical power and the power conditioning unit converts to AC electrical power at the appropriate voltage and frequency for grid applications. Such energy storage systems of the present invention are well suited to sustained charge or discharge cycles of several hour durations. As such, the systems of the present invention are suited to smooth energy supply/demand profiles and provide a mechanism for stabilizing intermittent power generation assets (e.g. from renewable energy sources). It should be appreciated, then, that various embodiments of the present invention include those electrical energy storage applications where such long charge or discharge durations are valuable. For example, non-limiting examples of such applications include those where systems of the present invention are connected to an electrical grid include renewables integration, peak load shifting, grid firming, baseload power generation/consumption, energy arbitrage, transmission and distribution asset deferral, weak grid support, and/or frequency regulation. Additionally the devices or systems of the present invention can be used to provide stable power for applications that are not connected to a grid, or a micro-grid, for example as power sources for remote camps, forward operating bases, off-grid telecommunications, or remote sensors.

ADDITIONAL ENUMERATED EMBODIMENTS

The following embodiments are intended to complement, rather than supplant, those embodiments already described.

Embodiment 1. An operating flow battery cell comprising:

(a) at least one half-cell comprising an inlet and an outlet, through which an electrolyte flows during the operation of the flow battery cell, thereby defining inlet and outlet streams of the electrolyte, respectively, with each said inlet and outlet streams characterized by a local state-of-charge; and (b) first and second electrodes positioned to contact and be in electrochemical communication with the inlet and outlet streams, respectively, and configured to allow detection of an electric potential difference between the two electrodes, said electric potential difference being reflective of the difference in the state of charge of the electrolyte in said inlet and outlet streams;

said first and second electrodes measuring electric potential difference between the two electrodes.

Embodiment 2. The flow cell of Embodiment 1, wherein the electrodes are positioned in at least one inlet and at least one outlet fluid path with electrochemical communication through at least one of the cells or stacks.

Embodiment 3. The flow cell of Embodiment 1 or 2, wherein the electrodes in contact with the inlet and outlet electrolyte streams are positioned across a separator to compose an electrochemical cell.

Embodiment 4. The flow cell of any one of Embodiments 1 to 3, wherein the electrodes comprise carbon.

Embodiment 5. The flow cell of any one of Embodiments 1 to 4, the flow cell being a flow battery cell.

Embodiment 6. An operating electrochemical stack comprising at least one flow cell of any one of Embodiments 1 to 5.

Embodiment 7. An electrochemical system comprising a flow cell of any one of Embodiments 1 to 5.

Embodiment 8. A method of operating a flow cell, said method comprising at least one half-cell comprising an inlet and an outlet through which electrolyte flows during the operation of the cell, thereby defining inlet and outlet streams of the electrolyte, respectively, for that half-cell, each inlet and outlet stream having a different local state-of-charge of the half-cell electrolyte, said method comprising measuring a difference in electrochemical potential between the inlet and outlet streams of the at least one half-cell and optionally taking corrective action.

Embodiment 9. A method of operating a flow cell of any one of Embodiments 1 to 5, a stack of Embodiment 6, or a system of Embodiment 7, said method comprising measuring a difference in electrochemical potential between the inlet and outlet streams of the at least one half-cell.

Embodiment 10. The method of Embodiment 8 or 9, wherein the difference in the local electrochemical potentials in the inlet and outlet is compared with a calibration curve.

Embodiment 11. The method of any one of Embodiments 8 to 10, wherein the difference in the local electrochemical potentials in the inlet and outlet informs a change in one or more electrolyte flow rates.

Embodiment 12. The method of any one of Embodiments 8 to 11, wherein the difference in the local electrochemical potentials in the inlet and outlet informs a change in one or more operating current densities, power densities, or voltages in a cell, stack, or plurality of cells or stacks.

Embodiment 13. The method of any one of Embodiments 8 to 12, wherein the difference in the local electrochemical potentials in at least one inlet and at least one outlet is used to assess the relative performance of at least one cell, stack, or plurality of cells or stacks.

Embodiment 14. The method of any of Embodiments 8 to 13, wherein the difference in the local electrochemical potentials in at least one inlet and at least one outlet is combined with another sensor output to provide information about the operating system.

Embodiment 15. The method of any one of Embodiments 8 to 14, further comprising correlating the monitored difference in electrical potential with a pre-defined set of control conditions indicative of state-of-charge or stoich.

Embodiment 16. The method of any one of Embodiments 8 to 15, further comprising adjusting at least one parameter associated with the operating electrochemical flow cell so as to alter the operation of the cell.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

In but one illustrative example, a 100 cm$^2$ electrode charging $Fe^{2+}$ to $Fe^{3+}$ at 0.1 A/cm$^2$ yields 10 amps of current. This may also be expressed as 1 Coulomb per second. If the electrolyte is fed at 0.1 L/min and is 0.5 mol/L in $Fe^{3+}$ (e.g., a 50% state-of-charge 1 M solution of $Fe^{3+/2+}$), this yields 0.05 mol/min, or 0.00083 mol/s. When converted to Coulombs using the Faraday constant 96485 C/mol, this may be expressed as 80 Coulombs per second worth of electron equivalents at the electrode in the form of $Fe^{2+}$ that may be charged to $Fe^{3+}$. The current density requires 10 C/s and 80 C/s is available. The "stoich" is then defined as the amount available divided by the amount required, and in this case the stoich is 8. Conversely, the "utilization" is defined as the amount of $Fe^{2+}$ consumed as the electrolyte passes through the cell/stack, and in this case the utilization will be 10/80 or 12.5%. It may readily be seen that for the same flow rate, total iron concentration, and current density, the stoich will change as the electrolyte is charged. Carrying through the same calculations for a 90% SOC 1 M Fe solution (a typical end-point for charging an energy storage system to "fully charged"), which is only 0.1 M in $Fe^{2+}$, yields a stoich of only 1.6 but a higher utilization of 62.5%.

Figure 6:
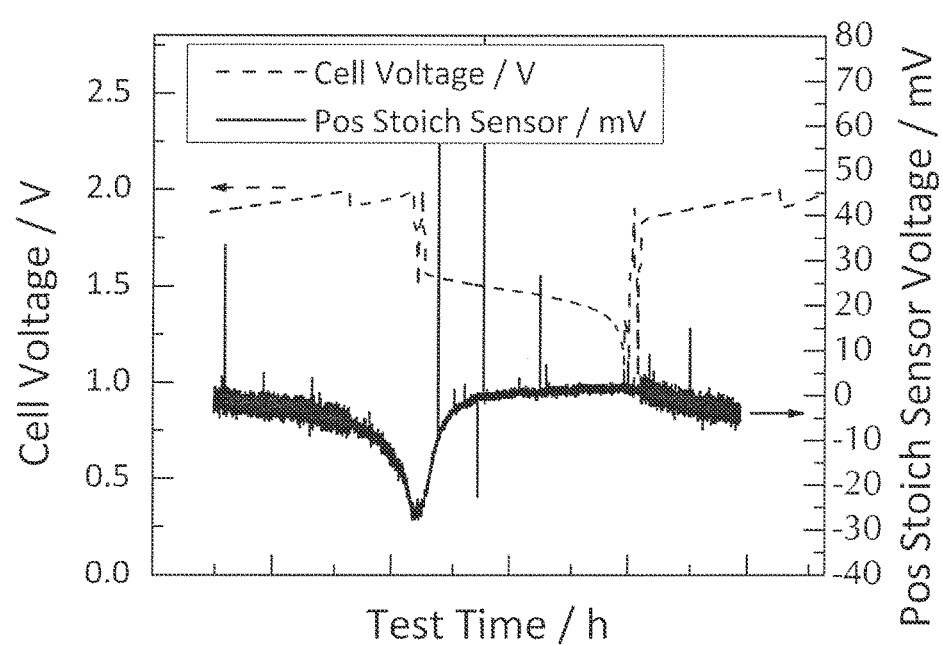
FIG. 6 shows data generated using a system having a $Fe(CN)_6^{4-/3-}$ positive half-cell, depicting the voltage difference between the inlet and outlet of a flow battery with this posolyte. In this case, the posolyte can be seen to be the limiting reagent at the end of charging (left ⅓ of plot), and the voltage difference becomes relatively large as the stoich drops towards the end of charging at constant current and flow rate. The posolyte is not limiting on discharge (middle ⅓ of plot), and the inlet/outlet voltage increases only modestly even though the cell voltage decreases precipitously (dashed curve).

FIG. 6 shows data generated using a system having a $Fe(CN)_6^{4-/3-}$ positive half-cell, depicting the voltage difference between the inlet and outlet of a flow battery with this posolyte. In this case, the posolyte can be seen to be the limiting reagent at the end of charging (left ⅓ of plot), and the voltage difference becomes relatively large as the stoich drops towards the end of charging at constant current and flow rate. The posolyte is not limiting on discharge (middle ⅓ of plot), and the inlet/outlet voltage for the posolyte streams increases only modestly even though the cell voltage decreases precipitously (dashed curve). The posolyte is the limiting reagent at the end of charging (solid trace, left ⅓ of plot), and the voltage difference becomes relatively large as the stoich drops towards the end of charging at constant current and flow rate. The posolyte is not limiting on discharge (middle ⅓ of plot), and the inlet/outlet voltage increases only modestly even though the cell voltage decreases precipitously.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A flow battery cell comprising:
   at least one half-cell comprising an inlet stream and an outlet stream, said inlet stream and said outlet stream being characterized by local states-of-charge; and
   first and second electrodes positioned to be in electrochemical communication with the inlet stream and the outlet stream, respectively, and configured to allow detection of an electric potential difference between the first and second electrodes, said electrical potential difference being reflective of a difference in state-of-charge of an electrolyte in said inlet stream and said outlet stream, and said first and second electrodes measuring electric potential difference between the first and second electrodes.

2. The flow battery cell of claim 1, wherein the first and second electrodes are positioned in at least one inlet fluid path and at least one outlet fluid path with electrochemical communication through at least one of the flow battery cell or a stack thereof.

3. The flow battery cell of claim 1, wherein the first and second electrodes in contact with the inlet stream and the outlet stream are positioned across a separator to compose an electrochemical cell.

4. The flow battery cell of claim 1, wherein the first and second electrodes comprise carbon.

5. An electrochemical stack comprising at least one flow battery cell of claim 1.

6. An electrochemical system comprising a flow battery cell of claim 1.

7. A method of operating the flow battery cell of claim 1, comprising:
   measuring a difference in electrochemical potential between the inlet stream and the outlet stream of the at least one half-cell.

8. The method of claim 7, wherein the difference in electrochemical potential between the inlet stream and the outlet stream is compared with a calibration curve.

9. The method of claim 7, wherein the difference in electrochemical potential between the inlet stream and the outlet stream informs a change in one or more electrolyte flow rates.

10. The method of claim 7, wherein the difference in electrochemical potential between the inlet stream and the outlet stream informs a change in one or more operating current densities, power densities, or voltages in the flow battery cell or a stack thereof.

11. The method of claim 7, wherein the difference in electrochemical potential between the inlet stream and the outlet stream is used to assess the relative performance of the flow battery cell or a stack thereof.

12. The method of claim 7, wherein the difference in electrochemical potential between the inlet stream and the outlet stream is combined with another sensor output to provide information about an operating system comprising the flow battery cell.

13. The method of claim 7, further comprising:
   correlating the difference in electrochemical potential with a pre-defined set of control conditions indicative of state-of-charge or stoich.

14. The method of claim 7, further comprising:
   adjusting at least one parameter associated with the flow battery cell so as to alter the operation of the flow battery cell.

* * * * *